(12) United States Patent
Toms et al.

(10) Patent No.: US 7,474,891 B2
(45) Date of Patent: *Jan. 6, 2009

(54) DYNAMIC DIGITAL UP AND DOWN CONVERTERS

(75) Inventors: Jerry E. Toms, Shakopee, MN (US); Jeffrey J. Cannon, St. Louis Park, MN (US); Jeffrey O. Brennan, Waseca, MN (US); Donald R. Bauman, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/095,628

(22) Filed: Mar. 31, 2005

(65) Prior Publication Data

US 2006/0223468 A1 Oct. 5, 2006

(51) Int. Cl.
*H04M 3/00* (2006.01)
*H04B 1/00* (2006.01)

(52) U.S. Cl. ............... 455/419; 455/420; 455/552.1; 375/132

(58) Field of Classification Search ........... 455/552.1, 455/553.1, 418–420; 375/132
See application file for complete search history.

(56) References Cited

U.S. PATENT DOCUMENTS

| 4,569,042 | A |   | 2/1986 | Larson |   |
|---|---|---|---|---|---|
| 5,184,347 | A |   | 2/1993 | Farwell et al. |   |
| 5,276,691 | A |   | 1/1994 | Kivari |   |
| 5,544,222 | A | * | 8/1996 | Robinson et al. | 455/557 |
| 5,619,504 | A |   | 4/1997 | Van Grinsven et al. |   |
| 5,649,000 | A |   | 7/1997 | Lee et al. |   |
| 5,701,294 | A |   | 12/1997 | Ward et al. |   |
| 5,854,978 | A | * | 12/1998 | Heidari | 455/418 |
| 5,970,069 | A |   | 10/1999 | Kumar et al. |   |
| 6,047,002 | A |   | 4/2000 | Hartmann et al. |   |
| 6,091,765 | A |   | 7/2000 | Pietzold, III et al. |   |
| 6,097,733 | A | * | 8/2000 | Basu et al. | 370/468 |
| 6,188,898 | B1 | * | 2/2001 | Phillips | 455/433 |
| 6,363,421 | B2 |   | 3/2002 | Barker et al. |   |
| 6,381,289 | B1 |   | 4/2002 | Dutta |   |
| 6,463,060 | B1 |   | 10/2002 | Sato et al. |   |
| 6,496,546 | B1 |   | 12/2002 | Allpress et al. |   |
| 6,501,785 | B1 | * | 12/2002 | Chang et al. | 375/133 |

(Continued)

FOREIGN PATENT DOCUMENTS

EP 0936453 8/1999

(Continued)

OTHER PUBLICATIONS

U.S. Appl. No. 11/095,788, Conyers et al.

(Continued)

*Primary Examiner*—Duc M Nguyen
(74) *Attorney, Agent, or Firm*—Fogg & Powers LLC

(57) ABSTRACT

The present invention relates to dynamically configured wireless communication systems. In particular, in one embodiment, dynamically configured up and down converters in a communication system is provided. The method comprises receiving a request to change a protocol in a communication channel. Obtaining one or more parameters associated with the change in protocol of the communication channel and applying the parameters to the up and down converters.

20 Claims, 7 Drawing Sheets

U.S. PATENT DOCUMENTS

| | | | |
|---|---|---|---|
| 6,544,428 B1 | 4/2003 | Higashi | |
| 6,584,146 B2 | 6/2003 | Bose et al. | |
| 6,636,747 B2 * | 10/2003 | Harada et al. | 455/552.1 |
| 6,715,007 B1 | 3/2004 | Williams et al. | |
| 6,728,228 B1 | 4/2004 | Makela et al. | |
| 6,775,303 B1 | 8/2004 | Rustad et al. | |
| 6,775,305 B1 | 8/2004 | Delvaux | |
| 6,788,961 B2 | 9/2004 | Repice et al. | |
| 6,810,270 B1 | 10/2004 | Grohn et al. | |
| 6,829,229 B1 | 12/2004 | Palermo et al. | |
| 6,876,864 B1 | 4/2005 | Chapin | |
| 6,882,851 B2 | 4/2005 | Sugar et al. | |
| 6,889,354 B2 | 5/2005 | Feldman et al. | |
| 6,912,228 B1 | 6/2005 | Dahlman et al. | |
| 6,931,074 B1 | 8/2005 | Palermo et al. | |
| 6,957,086 B2 * | 10/2005 | Bahl et al. | 455/557 |
| 7,035,932 B1 | 4/2006 | Dowling | |
| 7,058,789 B2 | 6/2006 | Henderson et al. | |
| 7,069,574 B1 | 6/2006 | Adams et al. | |
| 7,099,687 B1 * | 8/2006 | Ostman et al. | 455/552.1 |
| 7,116,682 B1 | 10/2006 | Waclawsky et al. | |
| 7,151,925 B2 | 12/2006 | Ting et al. | |
| 7,190,682 B2 | 3/2007 | Shepherd et al. | |
| 7,203,488 B2 | 4/2007 | Luneau | |
| 7,315,571 B1 | 1/2008 | Heidari et al. | |
| 2001/0024430 A1 | 9/2001 | Sekine et al. | |
| 2001/0031621 A1 | 10/2001 | Schmutz | |
| 2001/0037395 A1 | 11/2001 | Sabat, Jr. et al. | |
| 2002/0035633 A1 | 3/2002 | Bose et al. | |
| 2002/0093983 A1 | 7/2002 | Newberg et al. | |
| 2002/0169894 A1 | 11/2002 | Takla | |
| 2002/0186436 A1 | 12/2002 | Mani et al. | |
| 2002/0186674 A1 | 12/2002 | Mani et al. | |
| 2002/0187809 A1 | 12/2002 | Mani et al. | |
| 2002/0191565 A1 | 12/2002 | Mani et al. | |
| 2003/0036359 A1 | 2/2003 | Dent et al. | |
| 2003/0050098 A1 | 3/2003 | D'Agati et al. | |
| 2003/0142649 A1 | 7/2003 | Taniguchi | |
| 2004/0001429 A1 * | 1/2004 | Ma et al. | 370/210 |
| 2004/0005866 A1 * | 1/2004 | Igarashi | 455/78 |
| 2004/0033806 A1 | 2/2004 | Daniel et al. | |
| 2004/0042387 A1 | 3/2004 | Geile | |
| 2004/0132477 A1 | 7/2004 | Lundby et al. | |
| 2004/0156328 A1 | 8/2004 | Walton et al. | |
| 2004/0156449 A1 | 8/2004 | Bose et al. | |
| 2004/0198410 A1 | 10/2004 | Shepherd et al. | |
| 2004/0198453 A1 | 10/2004 | Cutrer et al. | |
| 2004/0209580 A1 | 10/2004 | Bose et al. | |
| 2005/0083876 A1 * | 4/2005 | Vialen et al. | 370/328 |
| 2005/0190855 A1 | 9/2005 | Jin et al. | |
| 2005/0280564 A1 | 12/2005 | Lee | |
| 2006/0034242 A1 | 2/2006 | Proctor, Jr. | |
| 2006/0141957 A1 * | 6/2006 | Fischer et al. | 455/119 |
| 2006/0206628 A1 * | 9/2006 | Erez | 710/8 |
| 2006/0222054 A1 * | 10/2006 | Conyers et al. | 375/132 |
| 2006/0227736 A1 * | 10/2006 | Conyers et al. | 370/328 |
| 2007/0032241 A1 * | 2/2007 | Busch et al. | 455/450 |
| 2008/0137575 A1 * | 6/2008 | Conyers et al. | 370/310 |

FOREIGN PATENT DOCUMENTS

| | | |
|---|---|---|
| EP | 1211817 | 6/2002 |
| WO | 0159993 | 8/2001 |
| WO | 2004047316 | 6/2004 |

OTHER PUBLICATIONS

U.S. Appl. No. 11/095,789, Hedin et al.
U.S. Appl. No. 11/094,848, Weaver et al.
U.S. Appl. No. 11/095,111, Hermel et al.
U.S. Appl. No. 11/095,112, Hedin et al.
U.S. Appl. No. 11/094,949, Hedin et al.
U.S. Appl. No. 11/095,113, Hedin et al.
U.S. Appl. No. 11/094,950, Hedin et al.
U.S. Appl. No. 11/094,947, Conyers et al.
U.S. Appl. No. 11/094,907, Conyers et al.
U.S. Appl. No. 11/095,150, Bauman et al.
U.S. Appl. No. 11/095,779, Hermel et al.

* cited by examiner

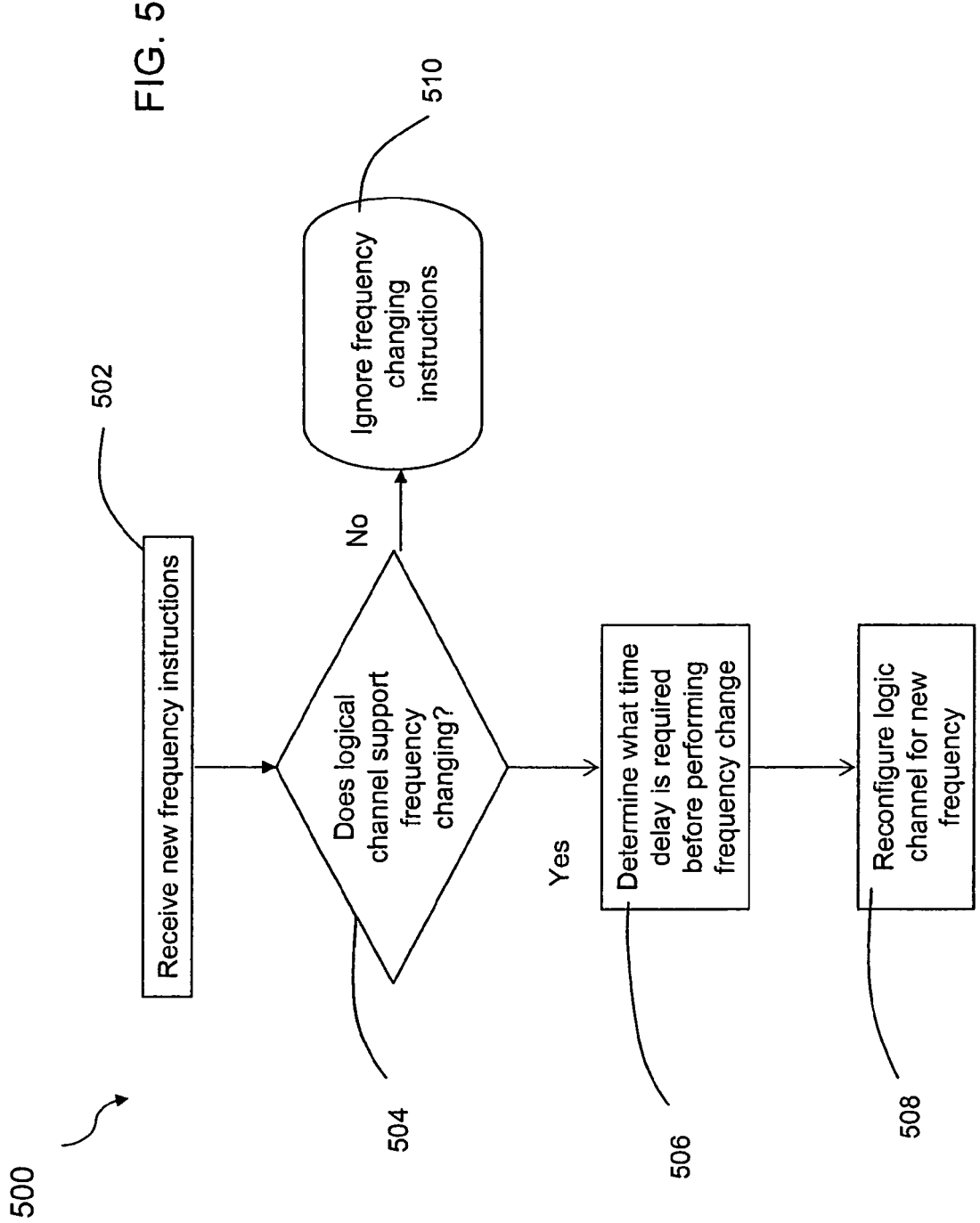

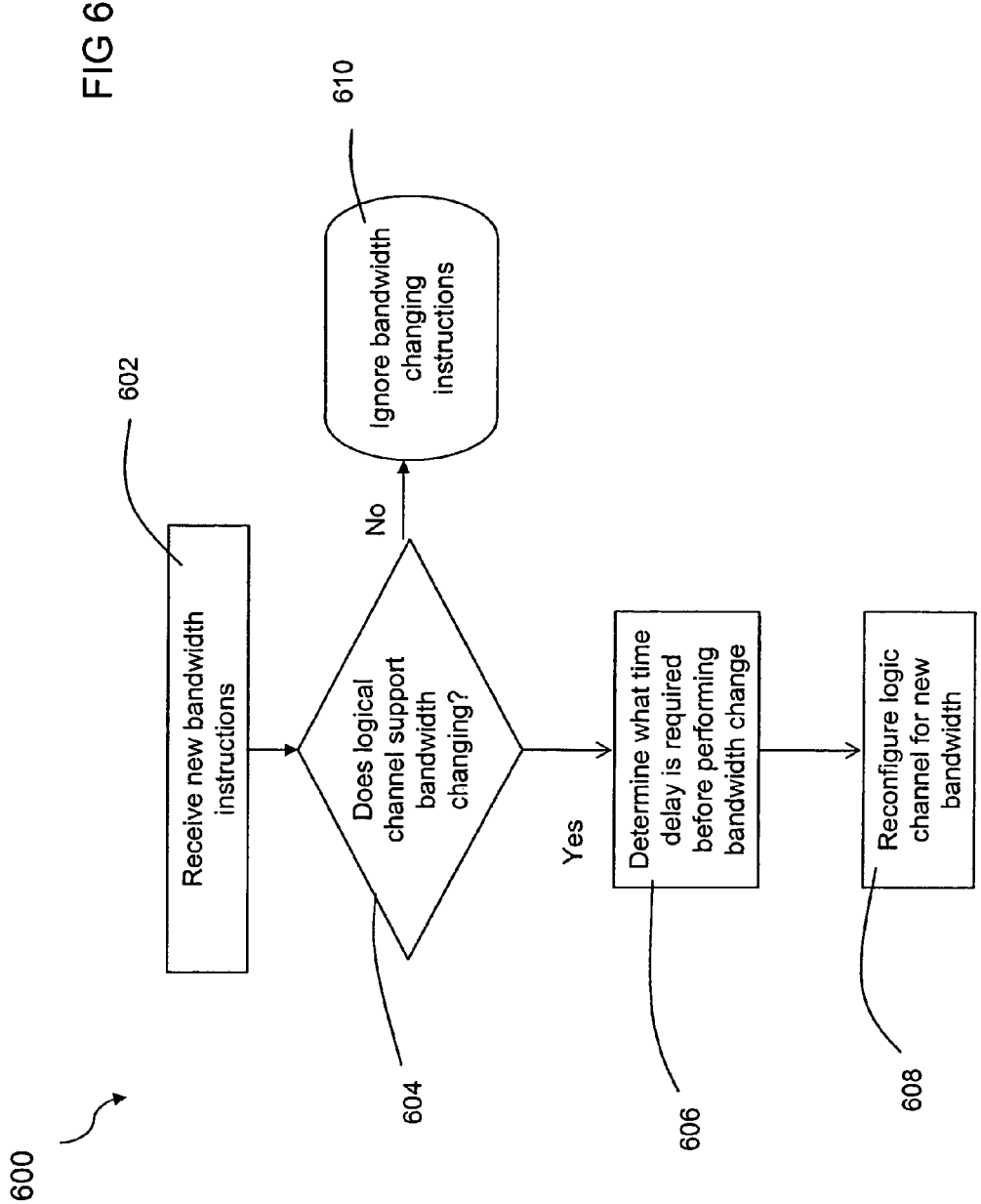

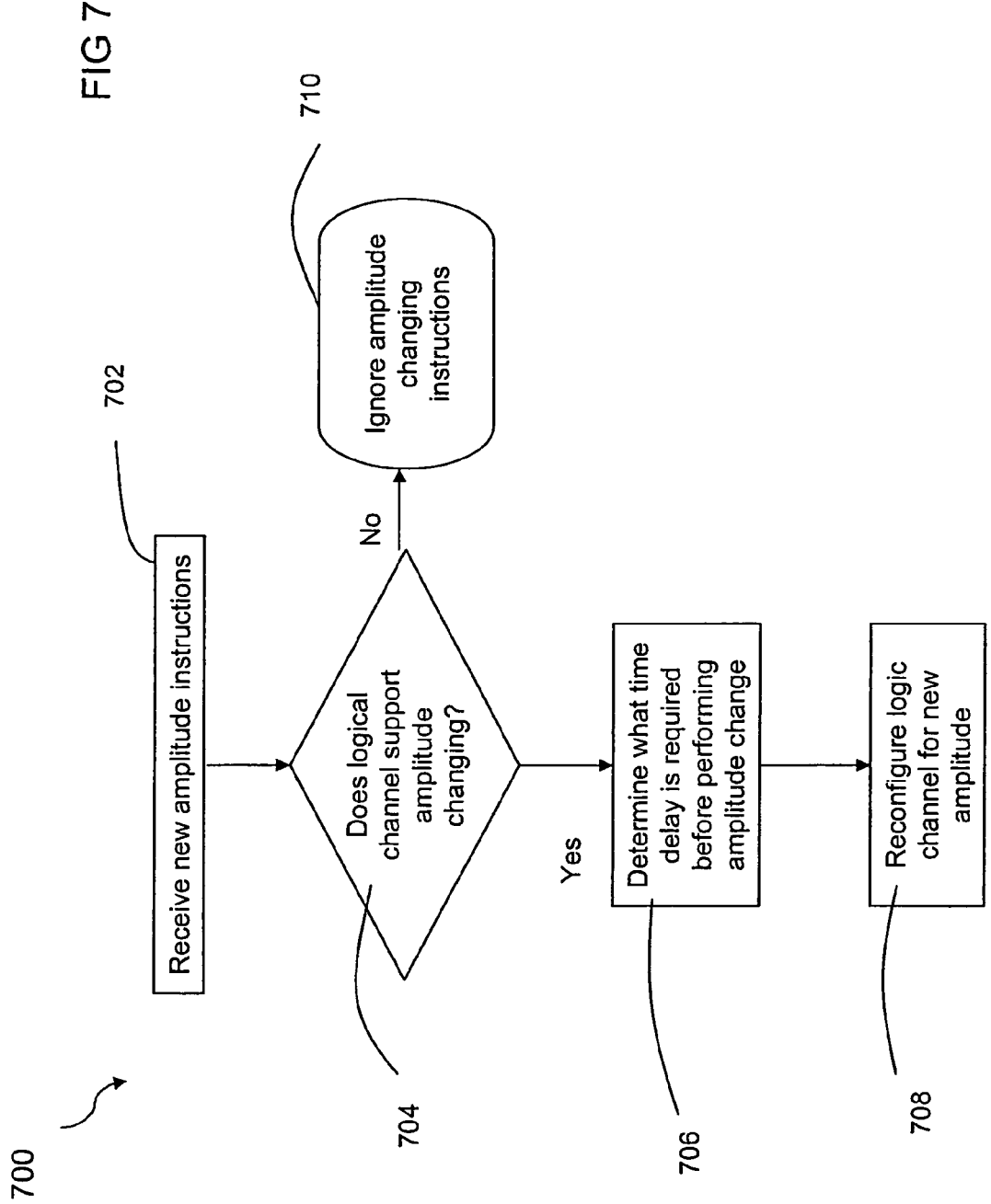

DYNAMIC DIGITAL UP AND DOWN CONVERTERS

CROSS REFERENCES TO RELATED APPLICATIONS

This application is related to the following co-pending United States patent applications filed on even date herewith, all of which are hereby incorporated herein by reference:

U.S. patent application Ser. No. 11/095,788 (the '672 application), entitled "DYNAMIC FREQUENCY HOPPING";

U.S. patent application Ser. No. 11/095,789 (the '675 application), entitled "DYNAMIC RECONFIGURATION OF RESOURCES THROUGH PAGE HEADERS";

U.S. patent application Ser. No. 11/094,848 (the '676 application), entitled "SIGNAL ENHANCEMENT THROUGH DIVERSITY";

U.S. patent application Ser. No. 11/095,111 (the '677 application), entitled "SNMP MANAGEMENT IN A SOFTWARE DEFINED RADIO";

U.S. patent application Ser. No. 11/095,112 (the '678 application), entitled "TIME STAMP IN THE REVERSE PATH";

U.S. patent application Ser. No. 11/094,949 (the '679 application), entitled "BUFFERS HANDLING MULTIPLE PROTOCOLS";

U.S. patent application Ser. No. 11/095,113 (the '680 application), entitled "TIME START IN THE FORWARD PATH";

U.S. patent application Ser. No. 11/094,950 (the '681 application), entitled "LOSS OF PAGE SYNCHRONIZATION";

U.S. patent application Ser. No. 11/094,947 (the '684 application), entitled "DYNAMIC REALLOCATION OF BANDWIDTH AND MODULATION PROTOCOLS";

U.S. patent application Ser. No. 11/094,907 (the '685 application), entitled "DYNAMIC READJUSTMENT OF POWER"; and U.S. patent application Ser. No. 11/095,150 (the '686 application), entitled "METHODS AND SYSTEMS FOR HANDLING UNDERFLOW AND OVERFLOW IN A SOFTWARE DEFINED RADIO)."

U.S. patent application Ser. No. 11/095,779 (the '700 application) entitled "INTEGRATED NETWORK MANAGEMENT OF A SOFTWARE DEFINED RADIO SYSTEM").

TECHNICAL FIELD

The present invention relates generally to communication systems and in particular to dynamically configured wireless communication systems.

BACKGROUND

Wireless telecommunications systems, particularly cellular telephone communications systems, employ strategically placed base stations having transceivers that receive and transmit signals over a carrier frequency band to provide wireless communications between two parties. Recent mobile communication standards have lead to a plurality of different modulation standards being in use within a geographic region. Wireless communication providers have had to adapt their network hardware to accommodate unique protocols associated with each modulation standard. Some modulation standards that wireless communication networks currently operate with include, but are not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

Current communication systems typically have dedicated hardware for each standard which results in idle resources at times when network demand for a particular standard is low. Moreover, typical base stations have limited resources dedicated to specific frequencies, bandwidths, and amplitudes for particular protocols. These resources communicate with remote units that are operating with the same protocol.

An issue that wireless communication systems must deal with is co-channel interference. Co-channel interference occurs when multiple sites are operating on the same physical channel and time slot causing interference. In order to prevent interference between channels, Global System for Mobile Communication (GSM) standards allow for frequency hopping and present algorithms for base stations to support frequency hopping. Frequency hopping generally refers to the changing of select parameters in at least one communication signal in a communication channel to avoid interference with another communication signal in the communication channel. Synchronization of when and what parameter to change to between the base station and a remote unit (cell phone, handheld, etc.) is required for frequency hopping to function properly. Therefore, there is a need for radio head interface cards (host cards) located within a server to align with the hopping associated with the remote unit and base station. As a result, a simple and accurate interface between the base station server and host cards is needed in order to stay current with the frequency hopping for each call. However, in current communication systems, when the use of different parameters or frequency hopping is required, an inefficient use of the limited resources occurs.

For the reasons stated above, and for other reasons stated below that will become apparent to those skilled in the art upon reading and understanding the present specification, there is a need in the art for changing the frequencies, bandwidths, and amplitudes that allows for the dynamic relocation of resources in a limited resource system.

SUMMARY

The above-mentioned problems and other problems are resolved by the present invention and will be understood by reading and studying the following specification.

In one embodiment, a method of dynamically configuring up and down converters in a communication system is provided. The method comprises receiving a request to change a protocol in a communication channel. Obtaining one or more parameters associated with the change in protocol of the communication channel and applying the one or more parameters to the up and down converters.

In another embodiment, a method of dynamically operating a communication system is provided. The method comprises receiving a page header from a call processing software module that indicates the desire to frequency hop and then determining if the requested frequency hop is permitted. When the frequency hop is permitted, retrieving parameters associated with the frequency hop. Implementing the parameters in a digital up converter and processing a page of data associated with the page header through the digital up converter.

In further another embodiment, a method of dynamically changing communication channels in one or more digital converters is provided. The method comprises selectively changing at least one of filter coefficients, numerically controlled oscillator (NCO) frequency, interpolation/decimation rates and sampling rates in the digital converter based at least in part on a message received in a page header of a page of data.

In yet another embodiment, a communication system is provided. The communication system includes a transmit engine, a timing circuit and at least one digital up converter. The transmit engine is adapted to transmit complex data samples. The timing circuit is adapted to control the timing of the complex data samples transmitted through the transmit engine. Each digital up converter is adapted to dynamically change at least one of filter coefficients, NCO frequency, interpolation/decimation rates and sampling rates based at least in part in information contained in a page header. The digital up converter is further adapted to convert the complex data samples to passband signals.

In another embodiment, a radio head interface card is provided. The radio head interface card includes one or more digital up converters, one or more digital down converters and a controller. Each digital up converter is adapted to convert complex digital data samples to passband signals of a select protocol based upon at least one of filter coefficients, NCO frequency, interpolation/decimation rates and sampling rates loaded in the digital up converter. Each digital down converter is adapted to convert the passband signals to the complex digital data samples of a select protocol based upon the at least one of filter coefficients, NCO frequency, interpolation/decimation rates and sampling rates loaded in the digital down converter. The controller is adapted to read protocol information in a page header associated with the complex data samples. The controller is further adapted to load filter coefficients, NCO frequency, interpolation/decimation rates and sampling rates in associated up and down converters based at least in part on the protocol information in the page header.

In yet further another embodiment, a server in a communication system is provided. The server includes one or more radio head interface cards. Each radio head interface card is adapted to communicate with a radio head unit. Each radio head interface card includes one or more digital up converters, one or more digital down converters, a controller and an interface. Each digital up converter is adapted to convert complex digital data samples to passband signals of a select protocol based upon parameters loaded in the digital up converter. Each digital down converter is adapted to convert the passband signals to the complex data samples of a select protocol based upon parameters loaded in the digital down converter. The controller is adapted to read protocol information in a page header associated with the complex data samples. The controller is further adapted to load parameters in associated up and down converters based at least in part on the protocol information in the page header. The interface is adapted to information traveling between the radio head interface card and a call processing module.

In still another embodiment, a communication system is provided. The communication system includes a means for converting complex digital data samples to passband signals in a communication channel and a means for changing the protocol used in the communication channel based on information received in a page header associated with the communication channel.

BRIEF DESCRIPTION OF THE DRAWINGS

The present invention can be more easily understood and further advantages and uses thereof more readily apparent, when considered in view of the description of the preferred embodiments and the following figures in which:

FIG. 5 is a flow chart regarding frequency changing of one embodiment of the present invention;

FIG. 6 is a flow chart regarding bandwidth changing of one embodiment of the present invention; and FIG. 7 is a flow chart regarding amplitude changing of one embodiment of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide methods and systems to dynamically implement frequency, bandwidth and amplitude changing as well as reallocation of resources in mobile communications systems through the use of dynamically configured digital up and down converters. In particular, in embodiments of the present invention, parameters that control the up and down converters are dynamically changed on the fly to change at least one of frequency, bandwidth and amplitude of a communication signal in a communication channel. Accordingly, the need for a large amount of resources dedicated to specific frequencies, bandwidths, and amplitudes for particular protocols is eliminated due to the dynamic nature of the digital up and down converter configurations in the present invention, thus leading to a more efficient and lower cost system.

Figure 1:
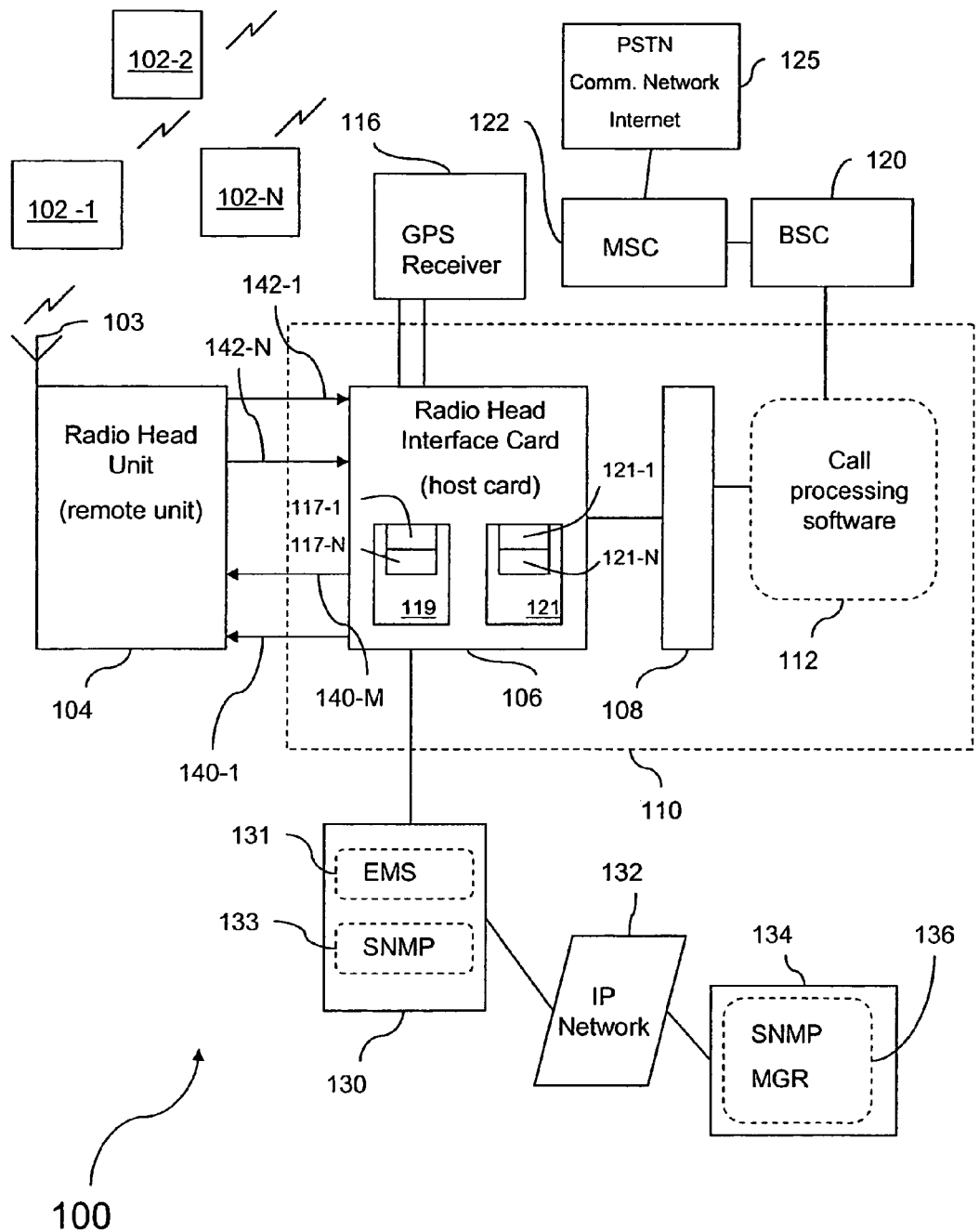
FIG. 1 is a block diagram of one embodiment of the present invention.

FIG. 1 is a block diagram of a communication system shown generally at 100 of one embodiment of the present invention. Communication system 100 includes one or more subscriber units 102-1 through 102-N (or mobile devices 102-1 through 102-N) within a service area of a radio head unit 104. Radio unit 104 is coupled to one or more servers 110 over a plurality of transport mediums 140-1 to 140-M, and 142-1 to 142-N. In one embodiment, transport mediums 140-1 to 140-M and 142-1 to 142-N comprise one or more high speed transport mediums. Examples of high speed transport mediums include, but are not limited to, optical fiber, millimeter wave, other microwave transmission systems, laser through the air (free space optics), coaxial, CAT 5 cabling or twisted pair wiring. Server 110 is connected to one or more communication networks 125 (e.g. the public switched telephone network (PSTN), Internet, cable network, or the like).

In operation, when a subscriber unit 102 emits a transmission signal within the designated coverage area, a radio head unit 104 through an antenna 103, picks up the signal. Subscriber unit 102 as used in this application includes but is not limited to cellular telephones, pagers, personal digital assistant, wireless modems, and other wireless terminals. Moreover, subscriber unit 102 may be a hand held device, a mobile station or a fixed station such as in a wireless local loop system. The radio head unit 104 communicates the received signals to server 110 for routing to one or more communication networks 125. In one embodiment, network 100 is a bidirectional network and as shown includes equipment for forward links (i.e. transmissions from the communications networks to the mobile device) and reverse links (i.e. transmissions from the mobile device to the communications networks).

Radio head unit 104 in one embodiment includes an antenna, duplexer, multicarrier power amplifier and low-noise amplifier (i.e. the radio "front end".) Other base station implementations including modulation/demodulation of data signals, encoding/decoding of data signals, and BSC interfaces are performed by server 110. Radio head unit 104 communicates with one or more subscriber units 102 in a particular coverage area over an RF link provided by radio head unit 104's associated antenna 103. Radio head unit 104 communicates over the RF link using any air interface standard. For example, the air interface standard for an RF link may comprise one of Advanced Mobile Phone System (AMPS), code division multiple access (CDMA), wide-band CDMA (WCDMA), time division multiple access (TDMA), Global System for Mobile communications (GSM), Cellular Digital Packet Data (CDPD), Enhanced Data for GSM Evolution (EDGE), General Packet Radio Service (GPRS), Integrated Digital Enhanced Network (iDEN), Orthogonal Frequency Division Multiplexing (OFDM) or any other appropriate air interface standard. The forward RF link is made up of a forward link RF channel over which radio head unit 104 transmits to a subscriber unit 102. Subscriber unit 102 transmits back to remote unit 104 over one or more reverse RF links made up of a reverse link RF channel.

In the reverse link, radio head unit 104 is responsible for receiving the RF uplink signal from subscriber units 102, digitizing the RF signal and converting the digitized RF signal to a digital representation signal for transmission as a data stream over one or more transport mediums 142-1 to 142-N. In the forward link, server 110 generates representations of voice/data signals into data streams that are transported to radio head unit 104 via transport mediums 140-1 to 140-M. In one embodiment, in the forward link, server 110 generates digital representations of voice/data signals. In one embodiment, transport mediums 140-1 to 140-M carry forward link logical channels and transport mediums 142-1 to 142-N carry reverse link logical channels.

Server 110 includes transmitters and receivers that enable subscriber units 102 to communicate with one or more communication networks. In one embodiment, server 110 also links subscriber unit 102 to other subscriber units that are communicating with other remote devices or base station systems. In the forward link, is responsible for modulating received voice and/or data signals and generating a digital representation of the voice/data signals for transmission to one more subscriber units 102. In one embodiment, in the forward link, remote unit 104 also converts digital representations of voice/data signals to digital signals and converts the digital signals to RF signals for transmission to subscriber unit 102. In the reverse link, server 110 performs functions associated with a base station transceiver including base station controller operations, modulation of the voice and data transmissions.

In one embodiment, server 110 is a general purpose computer that includes one or more radio head interface cards 106 coupled to communicate with one or more remote units 104 in the forward and reverse paths. As illustrated in FIG. 1, radio head interface card 106 couples to server 110 through interface 108 and communicates with one or more communication networks via call processing software 112. In one embodiment, radio head interface card 106 is a PCI-X card and is coupled to a PCI-X bus 108. Other embodiments of the present invention include both high speed serial and parallel interfaces standards such as ATCA, PCI express, gigabit Ethernet, SCSI, rocket I/O, UDP/IP, TCP/IP link, serial ATA, card bus (for PCMIA cards) and the like. In one embodiment, radio head interface card functions may be integrated directly into the computer rather than reside on a separate expansion card. In still another embodiment, radio head unit 104 and radio head interface card 106 can be combined into a single card.

Server 110 includes a call processing software module 112. The call processing software 112 interfaces between radio interface card 106 and one or more communication networks. In operation, call processing software 112 includes algorithms to support RF channel hopping and in one embodiment, includes algorithms to support channel hopping as designated in GSM standard 3GPP TS 05.02. Radio head interface card 106, which translates the baseband modulation signals up and down in frequency, is adapted to interface with call processing software 112 and implements frequency channel hopping based on information received via call processing software 112. Both radio head interface card 106 and subscriber unit 102 need to hop to the same frequencies at the same time to communicate over the RF channel. In embodiments of the present invention, the call software module 112 is interchangeable with the interface card so that it can be easily replaced or updated. Accordingly, embodiments of the present invention are not limited by design specific hardware.

In operation, each time BSC 120 initiates frequency hopping for one of the logical channels, call processing software 112 provides information to radio head interface card 106 so that RF channel hopping of the mobile device and RF channel hopping of host card 106 occur at the same time so that communications data is not corrupted or lost. The information may include one or more of bandwidths, frequencies and amplitudes. The server 110 performs the modulation/demodulation of voice and data streams using one or more air interface standards.

In one embodiment, in support of the GSM protocol, information provided by call processing software 112 to radio head interface 106 includes two pieces of information; the RF channel to hop to, and a designated time to make the hop. In operation, radio head interface card 106 will receive the two pieces of information and hop to the particular RF channel at the time identified. The designated time is based on host card 106's internal time count. In embodiments of the present invention, the hardware is running in real time while the call processing software is running on a batch process time. Embodiments of the present invention are adapted to interface the real time and the batch processing time. In one embodiment, radio head interface card 106 is adapted with a global positioning system (GPS) receiver 116 to control the internal time count of radio head interface and further synchronize server 110. In one embodiment, GPS receiver 116 outputs a one pulse per second signal, and a 10 MHz signal to radio interface card 106. In another embodiment, in support of the GSM protocol, information provided by call processing software 112 to radio head interface 106 includes an RF channel to hop to, and a trigger data sample that designates when to perform the frequency hop, instead of a designated time to perform the hop. In operation, radio head interface 106 hops to the new RF frequency on the transmission of the trigger data sample.

Call processing software 112 directly informs radio head interface card 106 of RF channel to use along with the time to hop to the RF channel, dynamically each time call processing software 112 determines the need to hop. As a result, there is no need for the call processing software 112 to send the radio head interface card 106 the GSM frequency hopping algorithms and corresponding tables in order for the card to perform the frequency channel hop. Moreover, there is no need to create and maintain corresponding alarm tables for the base station and the host card in embodiments of the present invention.

Radio head interface card 106 and radio head unit 104 can both handle multiple types of modulation protocols, and in different embodiments one or more of the logical channels may transmit data using a different modulation protocol than another. In one embodiment, host card 106 handles modulation for one or more of Advanced Mobile Phone System (AMPS), code division multiple access (CDMA), wide-band CDMA (WCDMA), time division multiple access (TDMA), Global System for Mobile communications (GSM), Cellular Digital Packet Data (CDPD), Enhanced Data for GSM Evolution (EDGE), General Packet Radio Service (GPRS), Integrated Digital Enhanced Network (iDEN), Orthogonal Frequency Division Multiplexing (OFDM) and the like. Some of these modulation protocols, such as GSM, support frequency hopping, while others do not. Accordingly, in embodiments of the present invention, radio head interface card 104 enables frequency hopping on a logical channel carrying data for a modulation protocol supporting frequency hopping, and disables frequency hopping on a logical channel carrying data for a modulation protocol that does not support frequency hopping.

In one embodiment, communication system 100 further includes a management PC 130 that controls the behavior of radio interface card 106 through element management system (EMS) software 131. In one embodiment, management PC 130 (or controller 130) is located within server 110. In another embodiment PC 130 is a stand alone PC. During initial configuration of communication system 100, the EMS software 131 is used to instruct radio head interface card 106 whether to enable or disable frequency hopping for a specific logical channel depending on the modulation protocol that will be used with that specific logical channel. Further, the EMS software 131 is adapted to know the modulation protocols and the valid ranges of RF channels supported by the specific hardware used to realize radio head unit 104. The valid RF channels for the specific radio head unit 104 are provided to radio head interface 106. In some embodiments, when call processing software 112 instructs radio head interface 106 to hop to an RF channel outside of the valid channels supported by radio head unit 104, radio head interface 106 generates an error condition flag. Further, in some embodiments, when call processing software 112 instructs radio head interface 106 to frequency hop at an invalid designated time, radio head interface 106 generates an error condition flag. Still further, in some embodiments, when call processing software 112 instructs radio head interface 106 to frequency hop a logical channel whose modulation protocol does not support frequency hopping (i.e. a logical channel whose frequency hopping was disabled by the EMS software 131), radio head interface 106 generates an error condition flag and the frequency hop request is ignored by radio head interface 106.

In one embodiment, management PC 130 is accessed remotely through the SNMP agent 133. A management unit 134 runs an SNMP manager 136 and is located remotely from management PC 130. Management unit 134 remotely controls the SNMP agent 133 through an IP network 132. SNMP manager 136 can be located anywhere and operate remotely as long as it is connected to some sort of IP network. Further details about the SNMP manager 136 and SNMP agent 133 are provided in the '677 application herein incorporated by reference. In other embodiments, an SNMP agent is not used. In fact, in one embodiment, an element management or network management system is used without an SNMP agent or SNMP manager.

Embodiment of radio head interface card 106 include a plurality of forward and reverse communication channels. In one embodiment, the radio head interface card includes 8 forward logical channels that accept 8 different baseband forward data streams and 8 reverse logical channels that accept 8 different baseband reverse data streams. In one embodiment, the channel number and time of hop is specified per logical channel as new information in a page header generated by call processing software 112. For each forward logical channel, call processing software 112 generates a page of data containing a collection of data samples, sometimes also called the payload of the page. In one embodiment, for each page, call processing software 112 also generates a page header which contains information including, but not limited to, a frequency hopping flag (indicating that frequency hopping instructions are contained within the header), an RF channel (indicating the RF channel assignment to begin using upon the next frequency hop), and frequency hopping trigger information (indicating when the logical channel should hop to the new RF channel). In another embodiment, the page header also contains bandwidth and amplitude information. In one embodiment, the frequency hopping trigger is a designated time. In another embodiment, the frequency hopping trigger is a trigger data sample that instructs radio head interface 106 to hop to the new RF channel upon receipt of the trigger data sample. Further details about communications between call processing software 112 and radio head interface 106 via information stored in data sample page headers are provided in the '675 application herein incorporated by reference.

As previously discussed, to establish a complete two way communication link with a subscriber unit 102, the link must include at least one forward RF channel and at least one associated reverse RF channel. To support channel hopping in both the forward and reverse logical channels, embodiments of the present invention include in the page header frequency hopping instructions for the reverse logical channel. In one embodiment, the page header includes an RF channel indicating the RF channel assignment for the reverse logic channel upon the next frequency hop. In one embodiment, the page header includes frequency hopping trigger information for the reverse channel. In some embodiments, the page header includes both an RF channel for the forward logic channel to hop to, and an RF channel for an associated reverse logic channel to hop to. In some applications it is not desirable to perform a frequency hop on both the forward and reverse logical channels simultaneously because of hardware or signal propagation delays. Therefore, in one embodiment, the reverse logical channel hops to the new reverse RF channel a specified time after the forward channel hops to the new forward RF channel. In one embodiment, host card 106 determines an appropriate time delay for hopping the reverse channel. In one embodiment, the duration of the time delay for hopping the reverse logic channel is included in the page header.

Frequency hopping in embodiments of the present invention is accomplished through digital up converter (DUC) circuit 119 and digital down converter (DDC) circuit 121. The DUC circuit 119 contains a plurality of dynamic configured digital up converters (DUCs) 117-1 through 117-N and the DDC circuit 121 contains a plurality of dynamic configured digital down converters (DDCs) 121-1 through 121-N. In operation, in one embodiment, radio head interface 106 receives a page of data samples from call processing software 112 for one of the logical channels. As stated above, the page includes a page header followed by a payload of data samples. An example of a header is described in the '675 application referenced and incorporated herein. In one embodiment, the page header includes a frequency hopping flag, a forward RF channel assignment, a reverse RF channel assignment, and a frequency hopping trigger. If radio head interface 106 identifies that the frequency hopping flag is set, it pulls off the channel hopping information from the header and loads the data samples to a DUC 117 in the DUC circuit 119 for transmission to radio head unit 104. At the point of time indicated by the frequency hopping trigger information, radio head interface 106 reconfigures the forward channel digital up converter to the new RF channel. Radio head interface 106 then reconfigures the associated reverse channel DDC 121 in the DDC circuit 119 to the new RF frequency. In some embodiments, reconfiguration of the reverse channel occurs after a time delay which in some embodiments is specified in the page header.

Depending on the page header information, a particular channel on a digital up converter 117 is selected to receive the information. This allows different channels on the digital up converter 117 to operate using different protocols. In one embodiment, the EMS 131 assigns the digital up converter channels to operate at specified protocols, frequencies, bandwidths or amplitudes. A DUC 117 and the assigned channel are matched up with a corresponding DDC 121. If a change in frequency, bandwidth or amplitude is desired the call processing software sets a flag in its page header. EMS 131 determines whether or not a change in frequency, bandwidth or amplitude is desired. A select DUC 117 then reconfigures the information communication signal pursuant to the parameters provided in the header. In one embodiment, this is done after a time delay contained in the header of the page. In one embodiment, buffers contained in each DUC 117-1 through 117-N and each DDC 121-1 through 121-N are utilized and receive the change in parameter requests and hold them until told by the call processing software to activate the changes. Once a DUC 117 and DDC 121 have been assigned a frequency, an amplitude or a bandwidth, testing is done to make sure that the particular parameter are not too high or too low. In one embodiment, DUCs 117-1 through 117-N and DDCs 121-1 through 121-N have band pass filters that allow the optical band pass to meet a regulatory requirement. Moreover, in one embodiment, DUCs 117-1 through 117-N and DDCs 121-1 through 121-N have numerically controlled oscillators to enable them to operate at a specific frequency. Each DUC 117-1 through 117-N takes a complex digital baseband signal and converts it to a real passband signal by being filtered and then modulated. Each DDC 121-1 through 121-N takes the signal and converts it to a baseband signal. This is done by taking the desired channel and translating it to baseband using a digital mixer and a direct digital synthesizer located within the DDC. The sample rate of the signal is then adjusted to match the channel bandwidth using a filter.

Figure 2:
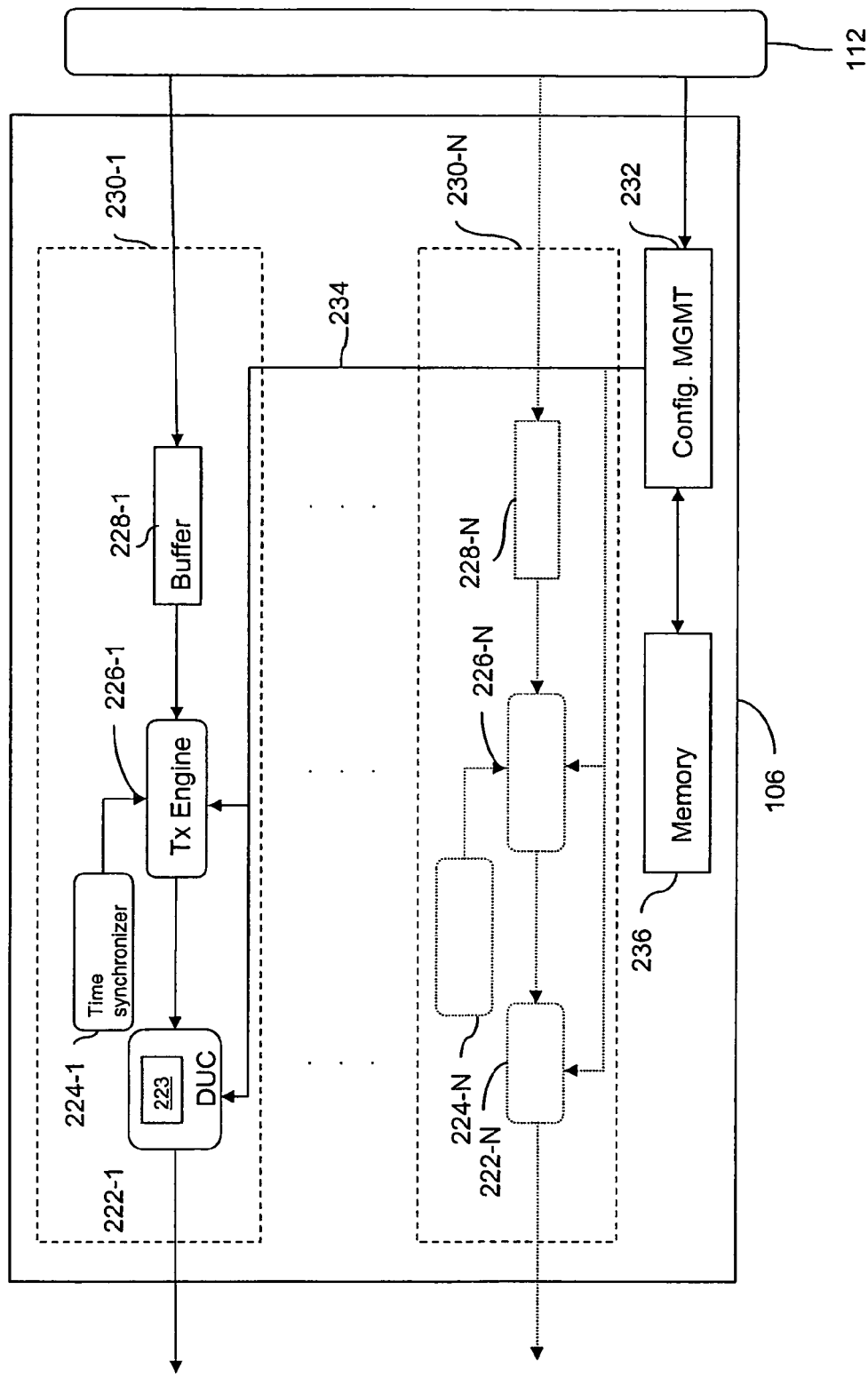
FIG. 2 is a block diagram illustrating digital up converter circuits of one embodiment of the present invention.
Figure 3:
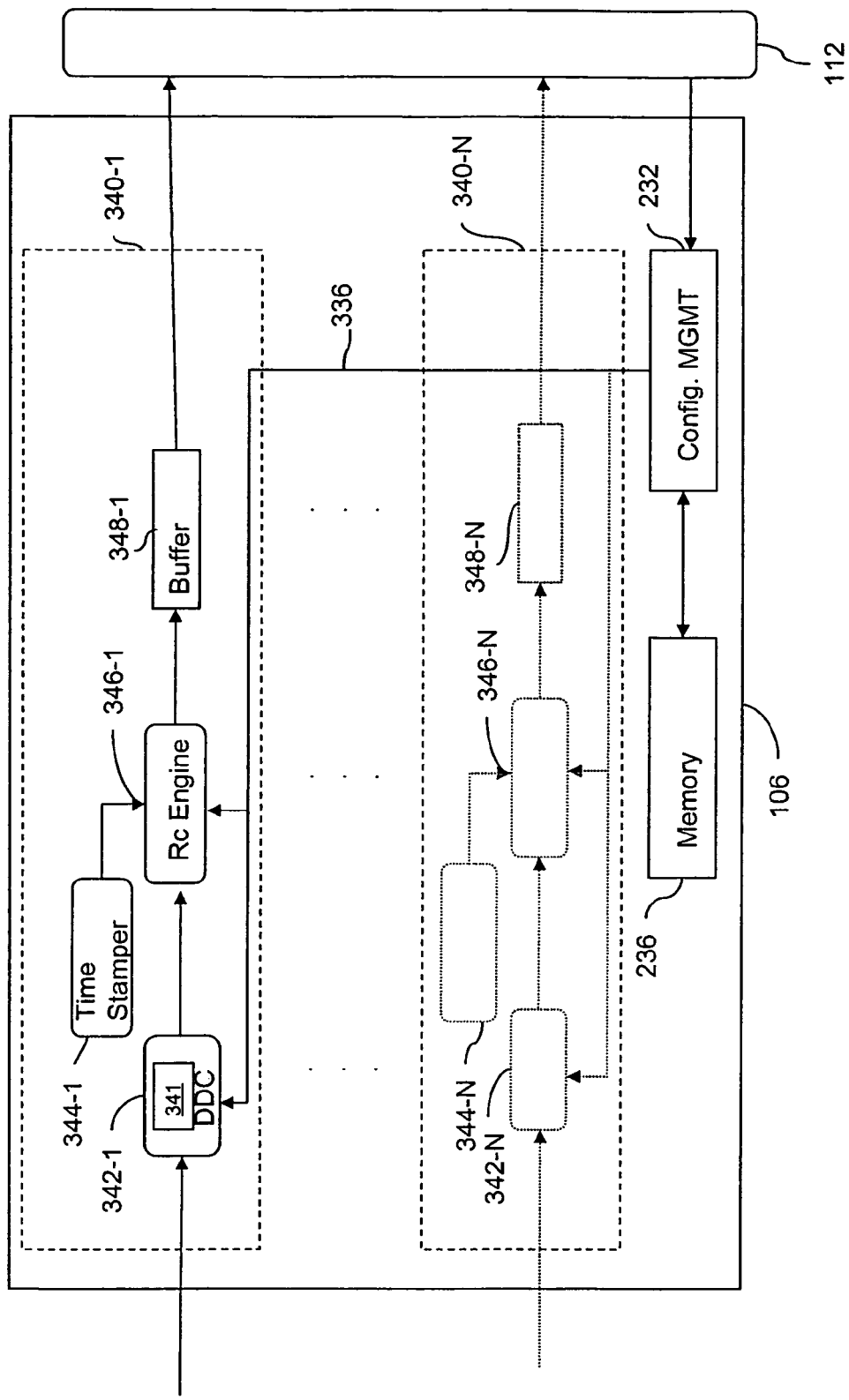
FIG. 3 is a block diagram illustrating digital down converter circuits of one embodiment of the present invention.

Further details concerning the operation of digital up converters and digital down converters in embodiments of the present invention are described in relation to forward and reverse paths of FIGS. 2 and 3. FIG. 2 illustrates one embodiment of a radio head interface card 106 that includes a plurality of N forward logical channels 230-1 through 230-N each having transmit buffers 228-1 through 226-N, transmit engines 226-1 through 226-N, DUCs 222-1 through 222-N and time synchronizers 224-1 through 224-N. Referring to forward channel 230-1, radio head interface 106 is dynamically reconfigurable to change modulation protocol. In operation, transmit buffer 228-1 contains a page of complex data samples (received from call processing software 112) waiting for transmission to radio head unit 104. Transmit engine 226-1 removes a page of complex data samples from the transmit buffer 228-1 and sends the data samples to DUC 222-1. In one embodiment, transmit engine 226-1 holds the page of complex data samples until time synchronizer 224-1 determines that the current time matches a start time code embedded within the page. When the two times match, transmit engine 226-1 starts transmitting the page of complex data samples to DUC 222-1.

A configuration management unit 232 receives information from call processing software module 112 to reconfigure logic channel 230-1 for a new modulation protocol. In one embodiment, configuration management unit 232 looks up associated parameters for the modulation protocol from a table located in a memory unit 236. Through a control channel 234, configuration management unit 232 (or controller 232) loads appropriate parameters into DUC 222-1. The parameters include filter coefficients, numerically controlled oscillator (NCO) frequency, interpolation/decimation rates, sampling rates and the like. In one embodiment, DUC 222-1 is adapted with a DUC buffer memory 223 that holds the parameters received from configuration management unit 232. In one embodiment, transmit engine 226-1 sends a synchronization signal to DUC 222-1 to load the parameters from the DUC buffer memory 223 into DUC 222-1's active registers. Once the parameters are loaded into the active registers, logic channel 230-1 begins operation under the modulation protocol specified by call processing software 112.

In one embodiment, radio head interface 106 is dynamically reconfigurable to change the signal bandwidth allocation for forward logic channel 230-1. In operation, in one embodiment, configuration management unit 232 receives information from call processing software module 112 to reconfigure the signal bandwidth allocation for logic channel 230-1. Configuration management unit 232 looks up the associated parameters for the new signal bandwidth allocation from the table located in memory unit 236. Through control channel 234 configuration management unit 232 loads the appropriate parameters to DUC 222-1. In one embodiment, DUC 222-1 is adapted with a DUC buffer memory 223 which holds the parameters received from configuration management unit 232. In one embodiment, transmit engine 226-1 sends a synchronization signal to DUC 222-1 to load the parameters from DUC buffer memory 223 into DUC 222-1's active registers. Once the parameters are loaded into the active registers, logic channel 230-1 is ready to begin operation with the new signal bandwidth allocation.

FIG. 3 illustrates one embodiment of a radio head interface card 106 that includes a plurality of N reverse logical channels 340-1 through 340-N each having receiver buffers 348-1 through 348-N, receive engines 346-1 through 346-N, DDCs 342-1 through 342-N and time stampers 344-1 through 344-N of the present invention. Referring to reverse logical channel 340-1, the radio head interface 106 is dynamically reconfigurable to change modulation protocol. In operation, in one embodiment, receive engine 346-1 receives complex data samples from DDC 342-1 and places them into a receiver buffer 348-1. As receiver buffer 348-1 fills, it creates a page of complex data samples. Time stamper 344-1 places, in a page header, the time the first complex data sample was received from DDC 342-1. The completed page is subsequently received and processed by call processing software module 112. In one embodiment, configuration management unit 232 is adapted to receive information from call processing software module 112 to reconfigure logic channel 340-1 for a new modulation protocol. A configuration management unit 232 looks up the associated parameters for the modulation protocol from the table located in memory unit 236. Through control channel 336 configuration management unit 332 loads the appropriate parameters to DDC 342-1. In one embodiment, DDC 342-1 is adapted with a DDC buffer memory 341 that holds the parameters received from configuration management unit 232. In one embodiment, an associate forward logic channel 330-1's transmit engine 326-1 sends a synchronization signal to DDC 342-1 to load the parameters from the DDC buffer memory 341 into DDC 342-1's active registers. Once the parameters are loaded into the active registers, the logic channel 140-1 is ready to begin operation under the new modulation protocol.

In one embodiment, radio head interface 106 is dynamically reconfigured to change the signal bandwidth allocation for reverse logic channel 340-1. In operation, in one embodiment, configuration management unit 232 receives information from call processing software module 112 to reconfigure the signal bandwidth allocation for logic channel 340-1. Configuration management unit 232 looks up the associated parameters for the new signal bandwidth allocation from the table located in memory unit 236. Through control channel 336 configuration management unit 232 loads the appropriate parameters and transfer rate to DDC 342-1. In one embodiment, DDC 342-1 is adapted with a DDC buffer memory 341 that holds the parameters from configuration management unit 232. In one embodiment, an associate forward logic channel 330-1's transmit engine 326-1 sends a synchronization signal to DDC 342-1 to load the parameters from the DDC buffer memory 341 into DDC 342-1's active registers. Once the parameters are loaded into the active registers, logic channel 340-1 is ready to begin operation within the new signal bandwidth allocation specified by call processing software module 112.

In one embodiment, the EMS 131 provides the memory 236 with the table having the associated parameters upon configuration. In another embodiment, the parameters are passed to the appropriate DUC 222-1 through 222-N and DDC 344-1 through 342-N upon a parameter request. In one embodiment, the parameters are passed to the appropriate DUC 222-1 through 222-N and DDC 344-1 through 342-N by the software processing module 114.

In one embodiment, configuration management unit 232 is adapted to know the different modulation protocols supported by the radio head unit 104 hardware, and the associated valid ranges of RF channels and signal bandwidths, based on the parameter table stored in memory unit 236. In one embodiment, the modulation protocols and the associated valid ranges of RF channels and signal bandwidths are loaded into memory unit 136 during the initial configuration of communications system 100. In one embodiment this is done by the EMS. In another embodiment, the modulation protocols and valid ranges of RF channels are received from the call processing software module 114 during a transmission.

As indicated above, in some embodiments, when call processing software module 114 instructs radio head interface 106 to configure a logical channel for a non-supported protocol or bandwidth, radio head interface 106 generates an error condition flag to call processing software module 112. In one embodiment, when call processing software module 114 instructs radio head interface 106 to change protocol or bandwidth at an invalid designated time, radio head interface 106 generates an error condition flag to call processing software module 112. In one embodiment, radio head interface 106 is adapted to disregard hopping instructions from call processing software module 112 that result in the generation of an error condition flag.

Figure 4:
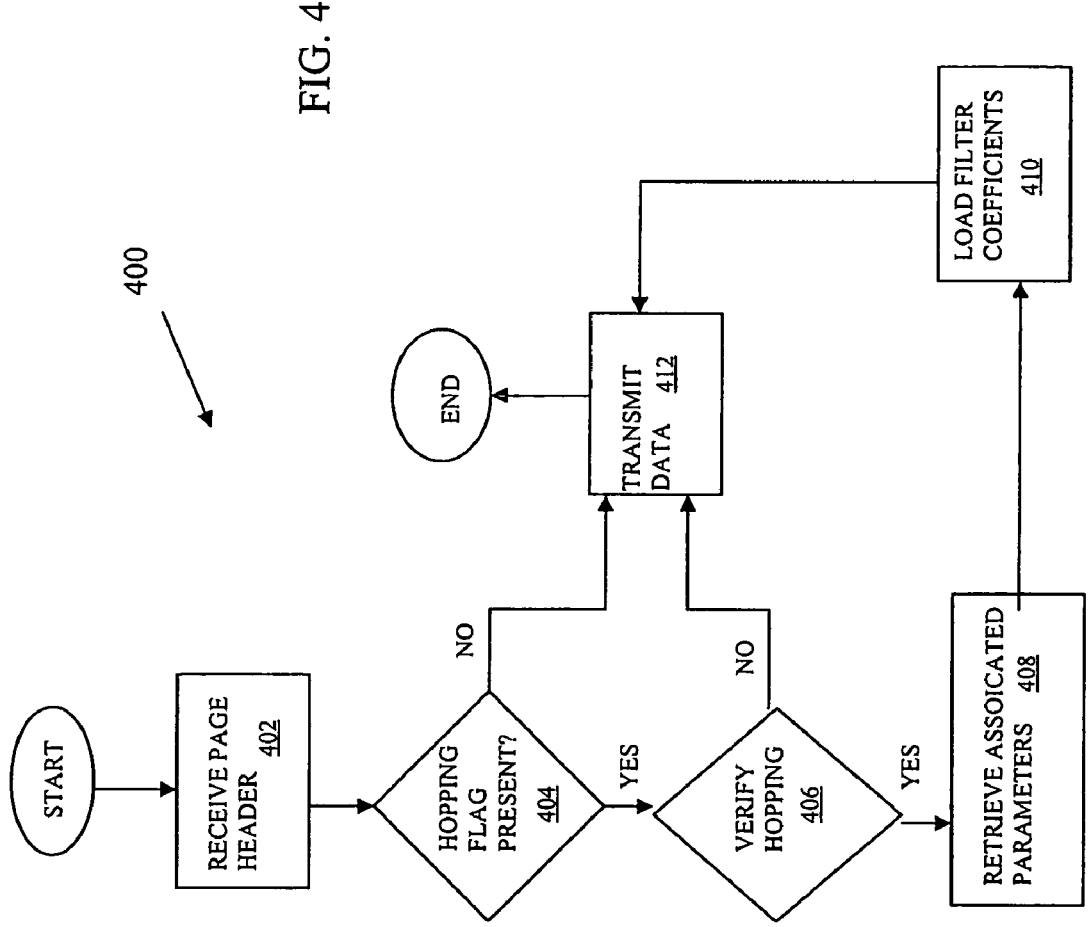
FIG. 4 is a flow chart regarding hopping of one embodiment of the present invention.

FIG. 4 is a flow chart 400 illustrating the dynamic changing of a communication protocol of one embodiment of the present invention. The process starts by receiving a page header (402). The page header is looked at to determine if a change in protocol is desired. In one embodiment, this is indicated with the presence of a hopping flag (404). If the hopping flag is not present (404), the page of information is transmitted without changing the protocol (412). If the hopping flag is present (404), in one embodiment, hopping is verified (406). In this embodiment, an error flag is generated if a non-supported protocol or bandwidth is requested or an invalid designation time is requested. In this embodiment, if hopping is not verified (i.e. an error flag is generated) (406), hopping instructions are disregarded and the page of information is transmitted without changing the protocol (412). If the hopping is verified 406, parameters associated with the protocol are retrieved (408). The parameters are then loaded into appropriate DUC and DDC to implement the protocol (410). The information in the page is then transmitted using the chosen protocol (412).

FIG. 5 is a flow chart of one embodiment of a method of dynamically changing frequencies shown generally at 500. A radio head interface receives frequency change instructions from processing software (502). In one embodiment, the change in frequency instructions are used for frequency hopping where the processing software indicates a RF channel to hop to and a designated time to perform the frequency hop for a logical channel. A radio head interface then checks the configuration of the logical channel to determine if the channel is configured for a modulation protocol that supports frequency changing (504). If the logical channel is not configured to support frequency changing then the frequency changing instructions are ignored (510). In one embodiment, determining if frequency changing is supported is decided by an EMS. If the logical channel is configured to support frequency changing (504), the radio head interface then determines what, if any, time delays are necessary before changing the frequency (506). Once any time delay is determined (506), the logical channel's frequency changes to the RF channel's frequency indicated by the processing software (508).

FIG. 6 is a flow chart of one embodiment of a method of dynamically changing bandwidths shown generally at 600. A radio head interface receives bandwidth instructions from processing software (602). In one embodiment, the change in bandwidth instructions are used for frequency hopping where the processing software indicates a RF channel to hop to and a designated time to perform the frequency hop for a logical channel. In one embodiment, the change in bandwidth is to accommodate a change in protocol. The radio head interface checks the configuration of the logical channel to determine if the channel is configured for a modulation protocol that supports bandwidth changing (604). If the logical channel is not configured to support bandwidth changing (604), then the bandwidth changing instructions are ignored (610). In one embodiment, determining if bandwidth changing is supported is conducted by an EMS. If the logical channel is configured to support bandwidth changing (604), the radio head interface then determines what, if any, time delays are necessary before changing the bandwidth (606). One any time delays are determined (606), the logical channel's bandwidth changes to the RF channel's bandwidth indicated by the processing software (608).

FIG. 7 is a flow chart of one embodiment of a method of dynamically changing amplitudes shown generally at 700. A radio head interface receives amplitude instructions from processing software (702). In one embodiment, the change in amplitude instructions is used for frequency hopping where the processing software indicates a RF channel to hop to and a designated time to perform the frequency hop for a logical channel. In one embodiment, the change in amplitude is to accommodate a change in protocol. The radio head interface then checks the configuration of the logical channel to determine if the channel is configured for a modulation protocol that supports amplitude changing (704). If the logical channel is not configured to support amplitude changing (704), then the amplitude changing instructions are ignored (710). In one embodiment, determining if amplitude changing is supported is decided by an EMS. If the logical channel is configured to support amplitude changing (704), the radio head interface then determines what, if any, time delays are necessary before changing the amplitude (706). Upon determining any time delays (706), the logical channel's amplitude changes to the RF channel's amplitude indicated by the processing software (708).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of dynamically configuring up and down converters in a communication system, the method comprising:
    receiving a request to change a protocol in a communication channel that indicates a desire to frequency hop;
    determining if the frequency hop is permitted;
    when the frequency hop is permitted, obtaining one or more parameters associated with the change in protocol of the communication channel; and
    applying the one or more parameters to the up and down converters;
    wherein the request to change protocol is received in the page header from a call processing software module.

2. The method of claim 1, wherein the one or more parameters include at least one of filter coefficients, numerically controlled oscillator (NCO) frequency, interpolation/decimation rates and sampling rates.

3. The method of claim 1, wherein the parameters is at least one of frequency, bandwidth and amplitude.

4. The method of claim 1, further comprising:
    changing sampling rates of the up and down converters in response to the one or more parameters.

5. The method of claim 1, wherein obtaining the one or more parameters associated with the change in protocol of the communication channel further comprises:
    reading the one or more parameters from a table stored in memory.

6. The method of claim 5, further comprising:
    storing valid parameters associated with protocols in the memory.

7. The method of claim 1, further comprising:
    delaying the changing of filter coefficients of at least one of the up and down converters.

8. The method of claim 6, further comprising:
    storing the filter coefficients in a buffer during the delay.

9. The method of claim 6, wherein the delay is for a select amount of time.

10. The method of claim 7, wherein the delay ends upon the receipt of a trigger data sample.

11. A method of dynamically operating a communication system, the method comprising:
    receiving a page header from a call processing software module that indicates the desire to frequency hop;
    determining if the requested frequency hop is permitted;
    when the frequency hop is permitted,
        retrieving parameters associated with the frequency hop;
        implementing the parameters in a digital up converter; and
        processing a page of data associated with the page header through the digital up converter.

12. The method of claim 11, wherein the page header further includes at least one of a trigger data sample that designates when to hop and a designated time to hop.

13. The method of claim 11, wherein determining if the requested frequency hop is permitted further comprises at least one of determining if a desired RF channel to hop to is outside of the valid channels supported by an associated radio head unit, if the frequency hop is requested at an invalid time and if the modulation protocol is not supported.

14. The method of claim 11 wherein retrieving parameters associated with the frequency hop further comprises:
    retrieving the parameters from a table in memory.

15. The method of claim 11, wherein the parameters includes at least one of filter coefficients, NCO frequency, interpolation/decimation rates and sampling rates.

16. The method of claim 11, further comprising:
    delaying the implementation of the parameters.

17. The method of claim 11, further comprising:
    implementing the parameters in an associated digital down converter.

18. The method of claim 17, further comprising:
    delaying the implementation of parameters in the associated down converter.

19. The method of claim 11, wherein determining if the requested frequency hop is permitted, further comprises:
    looking for an error condition flag.

20. The method of claim 11, further comprising:
    generating an error condition flag when at least one RF channel requested to hop to is outside of the valid channels supported by an associated radio head unit, the frequency hop requested is at an invalid time and the modulation protocol is not supported.

* * * * *